United States Patent
Hoch et al.

(10) Patent No.: US 8,300,323 B2
(45) Date of Patent: Oct. 30, 2012

(54) COLLIMATORS ASSEMBLIES

(75) Inventors: Stacy Hoch, Newark, OH (US); Yaser S. Abdelsamed, Granville, OH (US)

(73) Assignee: ABL IP Holding LLC, Conyers, GA (US)

( * ) Notice: Subject to any disclaimer, the term of this patent is extended or adjusted under 35 U.S.C. 154(b) by 243 days.

(21) Appl. No.: 12/710,625

(22) Filed: Feb. 23, 2010

(65) Prior Publication Data

US 2011/0204242 A1 Aug. 25, 2011

(51) Int. Cl.
*G02B 27/00* (2006.01)
(52) U.S. Cl. .................................. 359/712; 362/311.07
(58) Field of Classification Search .................. 359/642, 359/708, 712, 838–884; 362/296.09, 296.08, 362/311.04, 311.06, 311.07, 326
See application file for complete search history.

(56) References Cited

U.S. PATENT DOCUMENTS

| | | | |
|---|---|---|---|
| 5,825,137 A | 10/1998 | Titus | |
| 6,607,286 B2 * | 8/2003 | West et al. | 362/255 |
| 7,431,480 B2 * | 10/2008 | Godo | 362/311.06 |
| 2007/0263376 A1 | 11/2007 | Wilkinson | |
| 2010/0149804 A1 | 6/2010 | Abdelsamed | |

OTHER PUBLICATIONS

Non-Final Office Action for U.S. Appl. No. 12/637,242, mailed Dec. 6, 2011 (11 Pages).
Amendment and Response to Office Action for U.S. Appl. No. 12/637,242, filed Mar. 6, 2012 (12 pages).
Final Office Action for U.S. Appl. No. 12/637,242, mailed Mar. 28, 2012 (10 pages).

* cited by examiner

*Primary Examiner* — Darryl J Collins
(74) *Attorney, Agent, or Firm* — Kilpatrick Townsend & Stockton LLP

(57) ABSTRACT

Collimators and methods of making collimators. According to certain embodiments a collimator may be used with a light source, where the light source emits light along a light axis. The base of the collimator may be angled such that the collimator refracts the light in a direction that is angled relative to the light source axis. There may also be provided methods for making a collimator. According to one method, a mold is first provided that produces an uncut collimator having an extended portion. The uncut collimator may be cut at an angle to produce a collimator with an angled base. In another method, there may be a mold with a base cavity, and a wedge may be inserted in the base cavity. The wedge forms a collimator with an angled base.

14 Claims, 11 Drawing Sheets

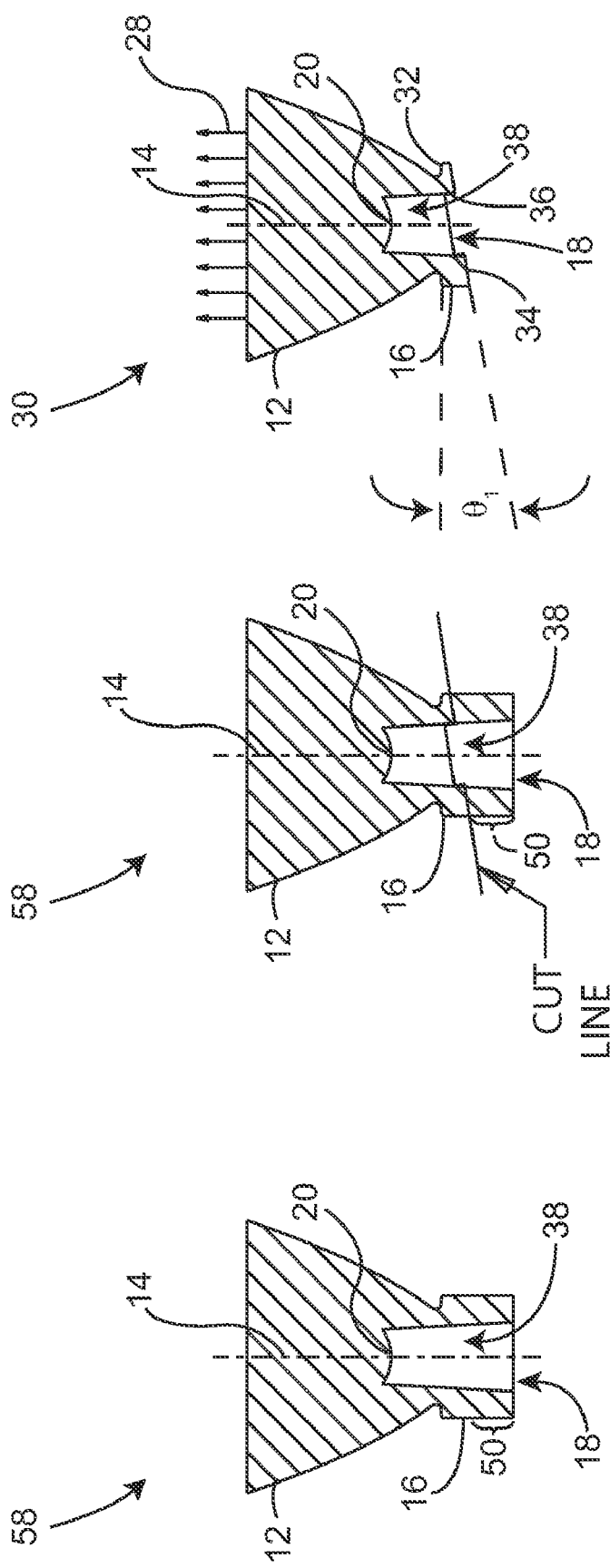

COLLIMATORS ASSEMBLIES

FIELD OF THE INVENTION

The invention relates generally to methods of manufacturing collimators.

BACKGROUND OF THE INVENTION

Collimators are optical devices that are used to focus and direct light that is emitted from a light source. One such light source might include a light-emitting diode, otherwise called an LED. The collimator is placed on top of the light source such that light is received by the collimator. Collimators typically have a main body that is shaped like a cone or a parabola and a centerline that extends through the collimator body. A collimator may also include an internal lens that receives the light from the light source. The collimator has a characteristic called total internal reflectance (or "TIR"), which means that the collimator refracts the rays of light and emits them in a direction generally parallel to the optical axis, which is generally coincident with the centerline of the collimator. Thus, collimators may be used to focus and direct light in the direction of the optical axis.

A light source is typically mounted on a board such that both the board and the light source lie in a horizontal plane. Because the light source is mounted horizontally, the light is emitted in a vertical direction. However, it may be desirable for the light to be emitted in directions that are not vertical. It may not be possible to simply angle either the mounting board or the light source in the desired angle due to design constraints. Thus, other methods must be used to control the angle of the emitted light.

For example, a collimator may be used to angle the direction that the light is emitted. One known solution is to tilt the collimator relative to the light source. Thus, the light source and mounting board remain horizontal, and the collimator is tilted relative to the light source. The light will be emitted out of the collimator in a direction approximately parallel to the optical axis due to the TIR of the collimator. Thus, because the collimator itself is tilted, the optical axis and the direction of emitted light are also tilted. One problem with such a method is that an open space or gap is typically created between the light source and the base of the collimator by virtue of such tilting. Thus, not all the light enters the collimator—some of the light escapes through the open space. Tilting the collimator may therefore result in a loss of energy, which might cause problems associated with heat and optical efficiency management.

Another known method is to use a prismatic optic in conjunction with the collimator. The prismatic optic has prisms that are tilted and angled in particular directions. In order to angle the light in a desired direction, a prismatic optic is selected that corresponds to that direction. The prismatic optic is placed on top of the collimator. Light is emitted from the collimator in a direction approximately parallel to the optical axis, enters the prismatic optic, and is emitted from the prismatic optic as refracted by the prisms in the prismatic optic. But one problem is that the extra optical surface will result in an energy loss of 8-10%, commonly referred to as Fresnel losses. Yet another problem is that each prismatic optic has prisms that are angled in only one direction. Thus, if light must be directed in a new angle, a new prismatic optic must be selected for that new angle. Such methods increase cost and manufacturing time.

Thus, there is a need for a collimator that can direct light in particular directions while minimizing energy loss.

There is also a need for a collimator that can direct light without the need for additional parts or optics, such as a prismatic optic.

Finally, there is a need for inexpensive and time-efficient methods of manufacturing collimators.

SUMMARY OF THE INVENTION

According to certain embodiments there is provided an assembly that includes a mounting board, a light source mounted to the mounting board and comprising a source axis, and a collimator. The collimator may include a main body that is generally parabolic or cone shaped and that defines a optical axis. Further, the collimator may include a base located adjacent the main body, the base comprising a top surface and a bottom surface that is oriented at an angle $\theta_1$ relative to the top surface. An aperture may extend into the main body of the collimator.

In use, the collimator is seated over the light source and onto the mounting board so that the bottom surface of the base contacts the top surface of the mounting board. Light emitted from the light source enters the collimator aperture and the collimator refracts and emits the light in a direction generally parallel to the optical axis. By adjusting angle $\theta_1$, the orientation of the collimator main body (and consequently the optical axis) relative to the light source may be adjusted to alter the angle at which light is emitted from the collimator. Additionally, the amount of escaped light is minimized because the base is positioned flush with the mounting board. Embodiments of the invention therefore both refract the light and minimize the amount of light that might escape from around the base of the collimator.

There may also be provided methods for making a collimator. According to one method, a mold is first provided. The mold may include at least one body cavity that comprises a parabolic shape, and at least one base cavity adjacent to the body cavity. The base cavity may include a top surface and a bottom surface that are separated by a distance d1. The method may further include injecting material into the mold and hardening the material to form an uncut collimator. Next, the uncut collimator is removed from the mold. According to certain embodiments the uncut collimator may include a main body (defined by the body cavity of the mold) and a base (defined by the base cavity of the mold). The base may include a top surface and a bottom surface, with an extended portion extending between the top and bottom surfaces. In some embodiments, the extended portion is cut off at an angle, such that the top surface of the base is angled by an angle $\theta_1$ with respect to the new cut surface. In other embodiments, however, the extended portion is not cut at an angle, such that the top surface of the base is parallel to the new cut surface. Such a method of manufacture is efficient because a single uncut collimator may be used to produce both angled and non-angled collimators using only minimal extra machining.

Other methods for making a collimator are also described herein. There may be provided a mold that defines at least one body cavity with a parabolic shape, and at least one base cavity adjacent to the body cavity. A wedge may be placed within the base cavity, and the wedge may have a top surface and a bottom surface that define an angle $\theta_1$ with respect to each other. The method may then comprise injecting material into the mold and hardening the material to form a collimator. Next, the collimator is removed from the mold. The collimator may comprise a main body (defined by the body cavity of the mold) and a base (defined by the wedge and the base cavity of the mold). The base includes a top surface and a bottom surface that are angled by the angle $\theta_1$ due to the use of the angled wedge. Such a method of manufacture is efficient because if desired, a collimator may be created having a base with a parallel top and bottom surfaces simply by removing the wedge from the mold. Thus, two separate molds (one having a base with parallel surfaces, and one having a base with angled surfaces) are not required. Only one mold is required, and use of the wedge permits creation of a collimator with a base having angled surfaces.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

FIGS. 7A-C illustrate methods of manufacturing a collimator, such as the collimator shown in FIGS. 2A-B, according to certain embodiments of the invention.

DETAILED DESCRIPTION OF THE INVENTION

Figure 1A:
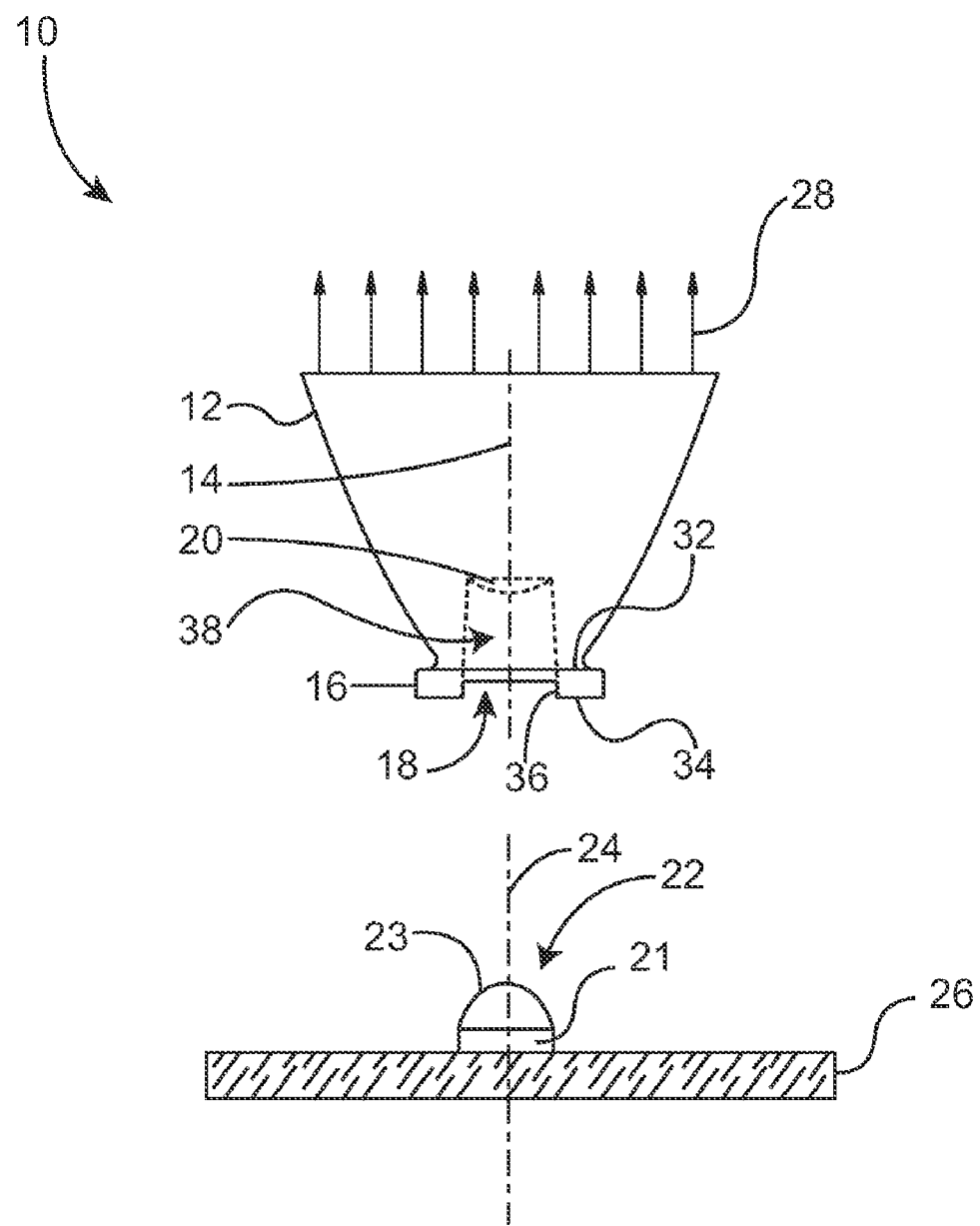
FIG. 1A is a side elevation view of a collimator according to certain embodiments of the invention with hidden structure shown in broken lines.

FIG. 1A shows a light source 22 mounted to a mounting board 26. One such light source 22 might include (but is not limited to) a light-emitting diode, otherwise called an LED. As shown, the light source 22 and the mounting board 26 lie in a horizontal plane. There might be certain design constraints that require the mounting board 26 and light source 22 to lie in the horizontal plane; for example, heat-transfer systems might require horizontal positioning of the components. That being said, one of skill in the art will readily understand that the light source 22 and mounting board 26 may be oriented in planes other than a horizontal plane. The light source 22 includes a lens 23 coupled to a light source base 21 and a source axis 24 through the light source 22. Light is emitted from the light source 22 in approximately the same direction as source axis 24. Thus, in FIG. 1A, the light source 22 is mounted horizontally and light is emitted in the vertical direction along source axis 24.

A collimator 10, 30 may be placed on top of the light source 22 and the mounting board 26. The collimators 10, 30 in FIGS. 1-2 are shown slightly elevated from the light source 22 for illustration purposes only in order to more clearly show the design of the collimator 10. It should be understood that in actual application, the collimator 10 seats over the light source 22 so that the bottom surface 34 of the base 16 contacts the mounting board 26.

Figure 1B:
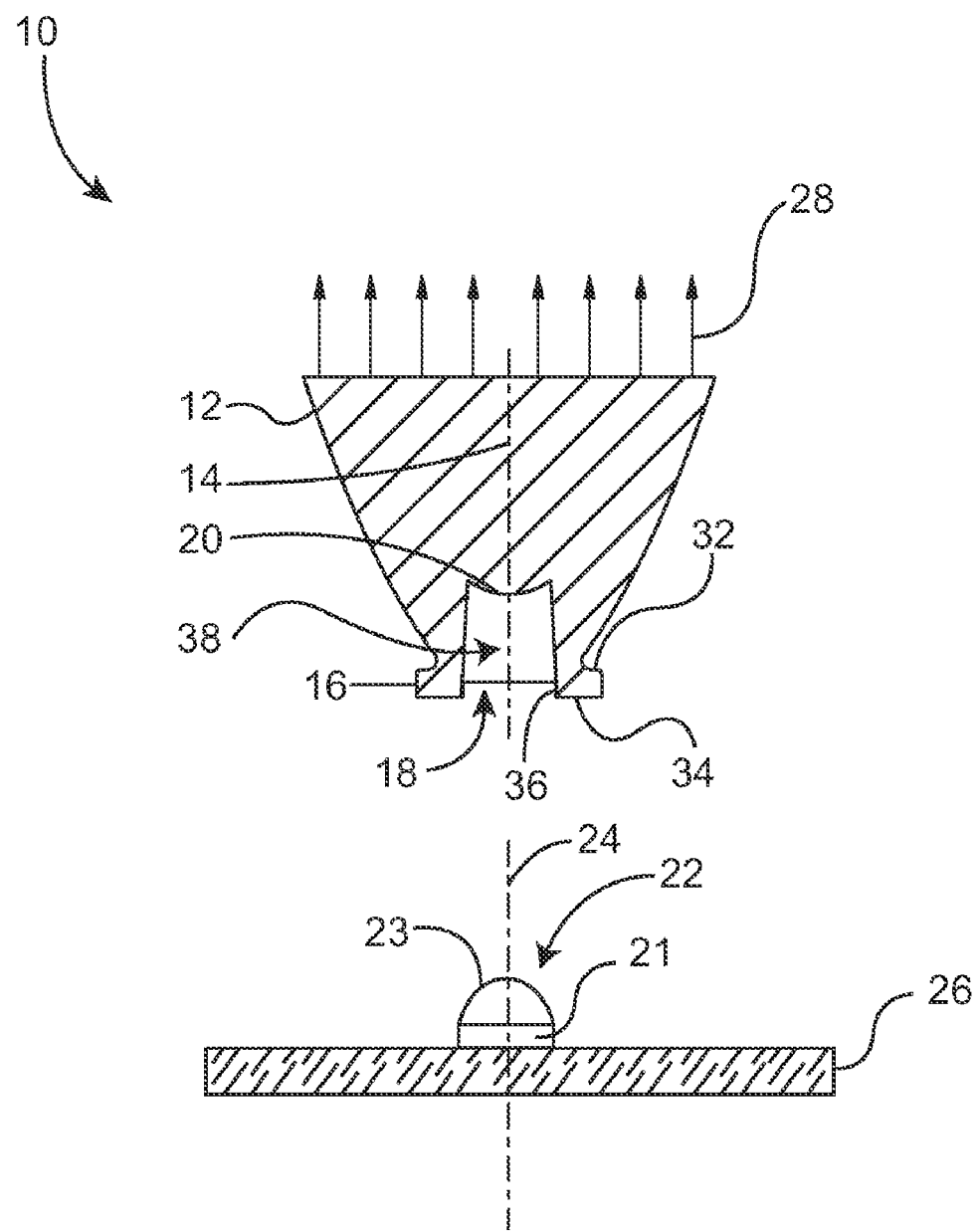
FIG. 1B is a cross-sectional view of the collimator in FIG. 1A.

The collimator 10 in FIGS. 1A-B has a main body 12 and a base 16. In certain embodiments the main body 12 has an approximate parabolic shape, but other embodiments may include a cone-like shape. The collimator 10 may also have a optical axis 14 that corresponds to the centerline of the cone or parabolic-shaped body 12. The base 16 of the collimator 10 may include a top surface 32 and a bottom surface 34. As shown in FIGS. 1A-B, the top and bottom surfaces 32, 34 of the base 16 are parallel to one another.

A channel 18 may be provided in the base 16. The channel 18 is preferably dimensioned to receive the light source 22 and more particularly the light source base 21. The size of the channel 18 may change depending on the size and dimensions of the particular light source 22. For example, the channel 18 in FIGS. 1-2 (and also in FIGS. 6C, 7C) extends across the base 16, because the particular light source 22 shown in these figures has an extended rectangular shape. But another light source 22 may be more square-shaped, and thus the channel 18 would not extend across the entire width of base 16. It should be understood that the dimensions of the channel 18 shown in the figures are not limiting. Rather, any sized channel 18 that permits the collimator to seat over the light source 22 and onto the mounting board 26 is appropriate.

An aperture 38 extends from the base 16 and into the collimator main body 12. There may be a lens 20 located at the top of the aperture 38; however, it should be understood that the lens 20 is optional and is in no way limiting. In certain embodiments the lens 20 is integrally formed with the main body 12 of the collimator 10 by machining or molding, for example. In FIGS. 1A and B, aperture 38 and lens 20 are all generally centered so they are coincident with the optical axis 14.

The collimator 10 is seated over the light source 22 and onto the mounting board 26 so that the bottom surface 34 of the base 16 contacts the mounting board 26. Light is emitted from the light source 22 and enters the aperture 38 of the collimator 10. Light passes through the lens 20, and due to the total internal reflectance ("TIR"), the collimator 10 emits the light in a direction generally parallel to the source axis 24 (as indicated by arrows 28).

Figure 2A:
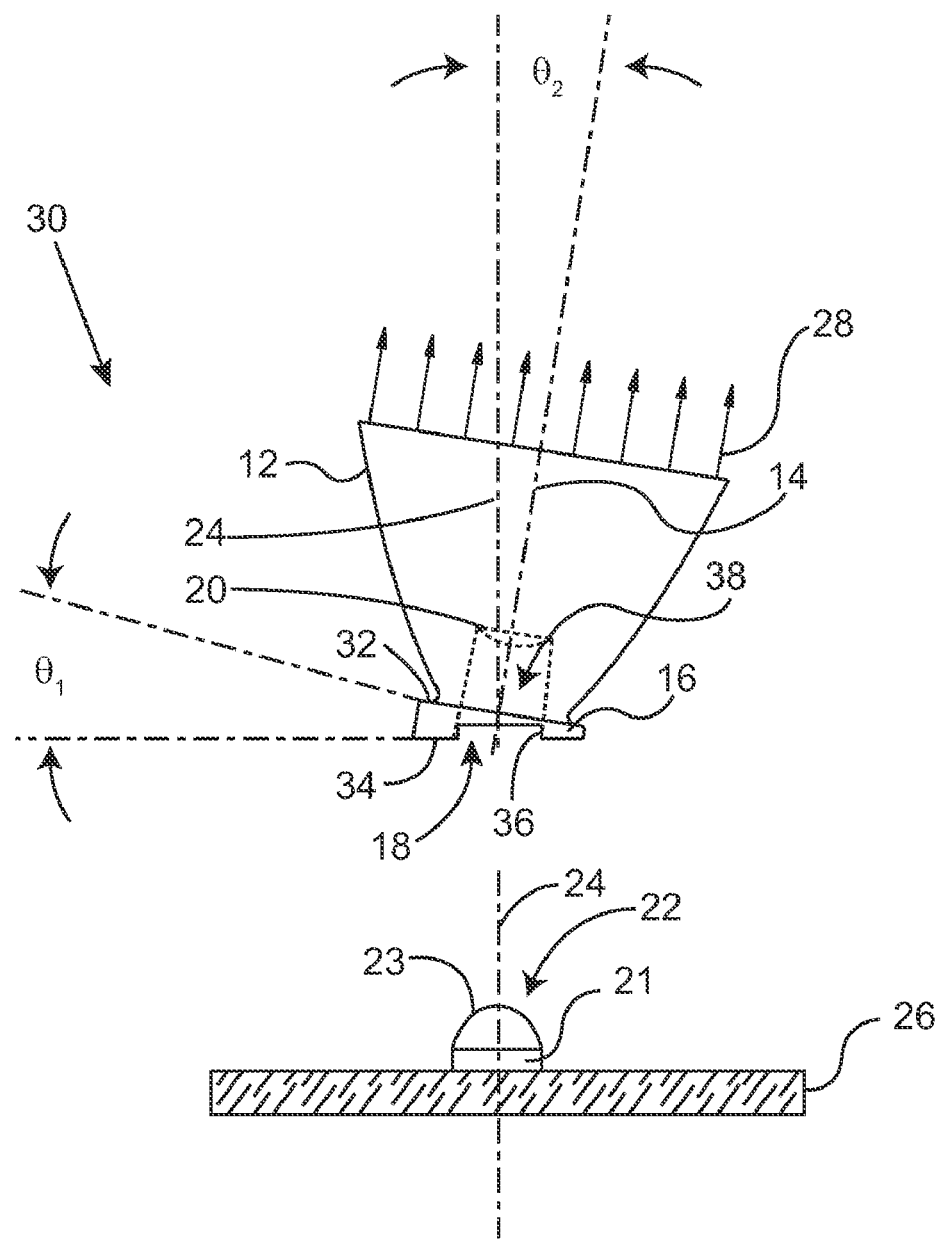
FIG. 2A is a side elevation view of a collimator according to other embodiments of the invention with hidden structure shown in broken lines.
Figure 2B:
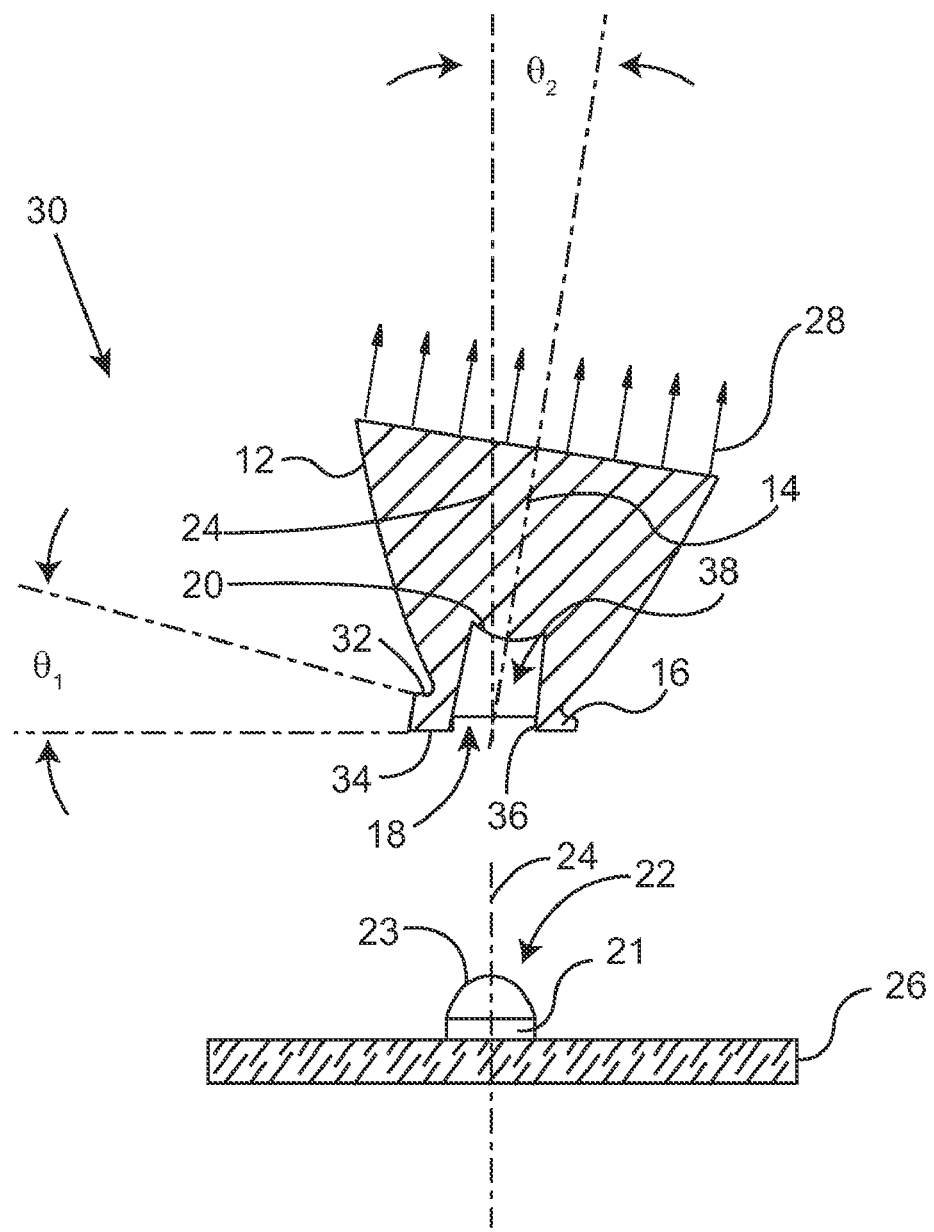
FIG. 2B is a cross-sectional view of the collimator in FIG. 2A.

In other applications it may be desirable to emit light in a direction that is not parallel to the source axis 24. This is accomplished by providing a collimator 30 having an angled base 16, as shown in FIGS. 2A-B. Collimator 30 may otherwise be structurally identical to collimator 10.

The base 16 of the collimator 30 may include a top surface 32 and a bottom surface 34. As shown in FIGS. 2A-B, the top and bottom surfaces 32, 34 of the base 16 are not parallel to one another. Rather, the top surface 32 and the bottom surface 34 define an angle $\theta_1$ with respect to each other. In some embodiments the angle $\theta_1$ may range from 0° to 90°; however, in some embodiments it may be preferred to provide an angle in the range of 0° to 20°, or most specifically (but not limiting) 17°. Angling of the top surface 32 of the base 16 tilts the main body 12 of the collimator 30 and thus the optical axis 14.

The collimator 30 is seated over the light source 22 and onto the mounting board 26 so that the bottom surface 34 of the base 16 contacts the mounting board 26. The top surface 32 of the base 16 is angled such that the main body 12 is angled relative to the light source 22 and mounting board 26 when seated thereon. Specifically, the optical axis 14 is angled by the angle $\theta_2$ with respect to the source axis 24. Light is emitted from the light source 22 and enters the aperture 38 of the collimator 30. Light passes through the lens 20, and due to the TIR, the collimator 30 refracts the rays of light and emits them generally parallel to the optical axis 14 (as indicated by arrows 28). Thus, the light is emitted from the collimator 30 at an angle $\theta_2$ with respect to the source axis 24. Generally, the angle $\theta_1$ of the base 16 is approximately equal to the angle $\theta_2$ between the optical axis 14 and the source axis 24. Thus, adjusting the angle $\theta_1$ between the top and bottom surfaces of the base controls the angle $\theta_2$ at which light is emitted from the collimator.

Methods of manufacturing the collimators 10, 30 will now be described. In certain methods the collimators 10, 30 may be made with injection molding. Various molds 40, 42 are shown in FIGS. 3-5. It should be understood that FIGS. 3-5 illustrate only one-half of embodiments of molds that could be used to manufacture the collimators disclosed herein. One of skill in the art will understand that during manufacture the disclosed mold halves would be mated with an identical mold half to create the entire mold necessary to form the collimators 10, 30.

Figure 3A:
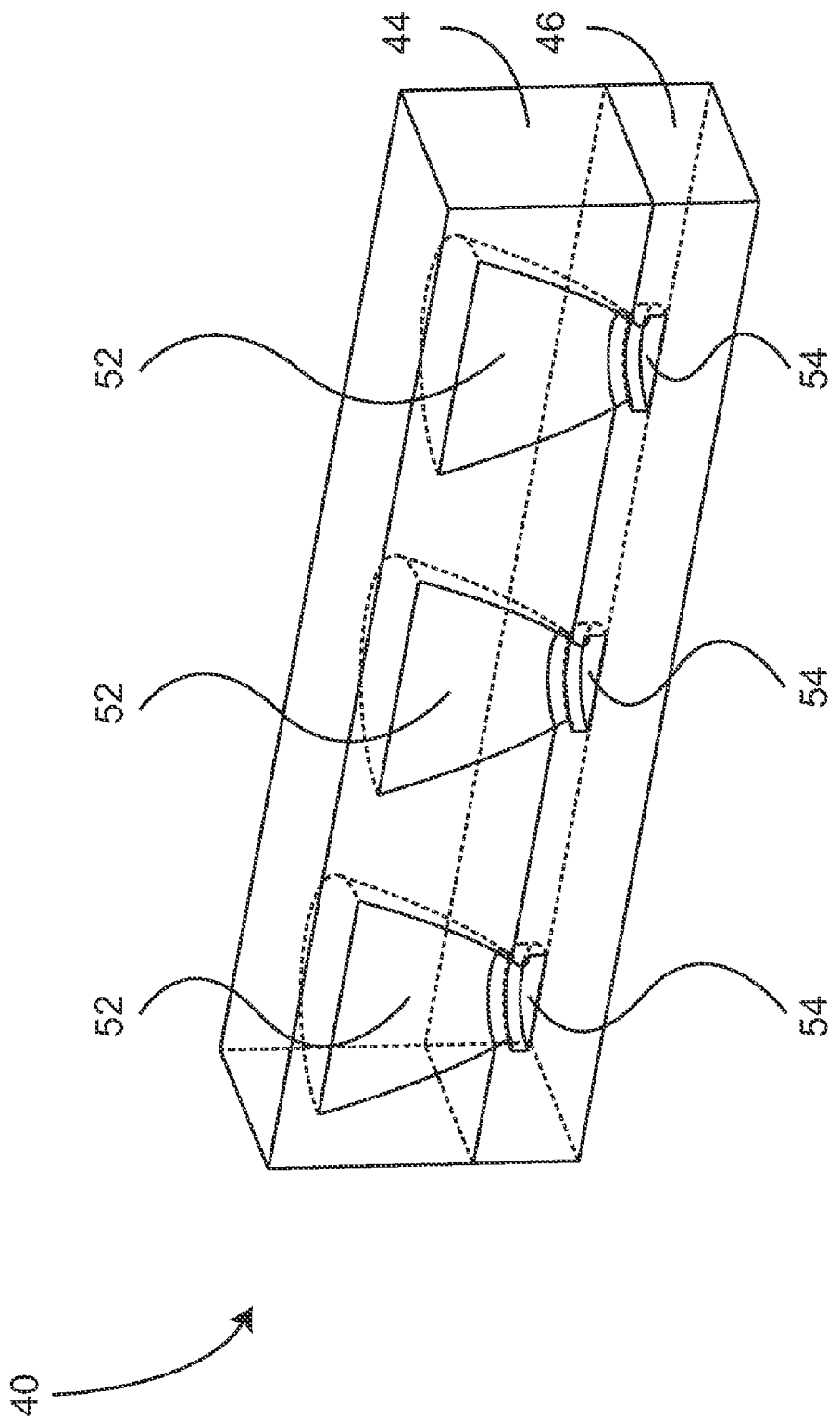
FIG. 3A is an isometric view of one-half of a mold (with hidden structure shown in broken lines) that may be used to make the collimator as shown in FIGS. 1A-B.
Figure 3B:
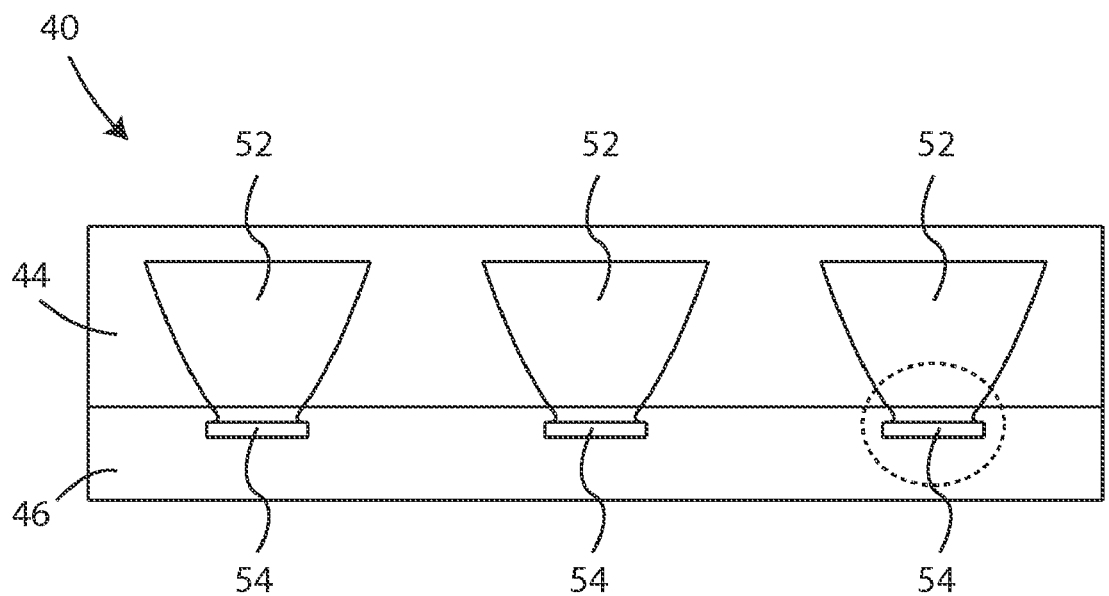
FIG. 3B is a side elevation view of the mold shown in FIG. 3A.
Figure 3C:
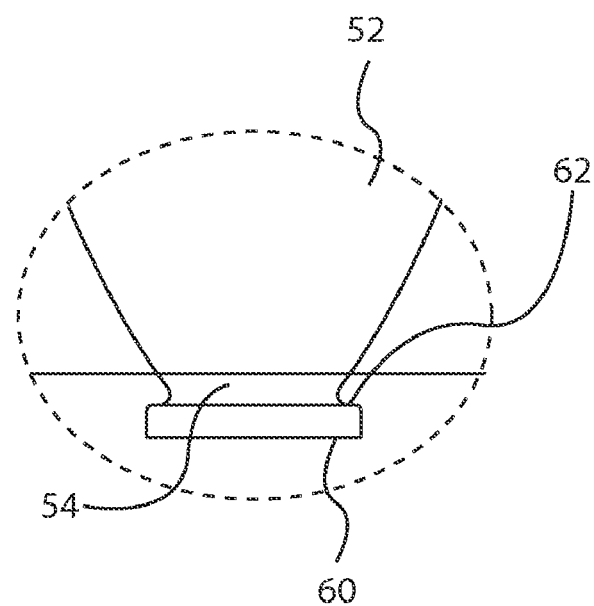
FIG. 3C is an enlarged fragmentary view of a portion of the mold shown in FIGS. 3A and B.

As shown in FIGS. 3A-C, in certain embodiments the mold 40 may include a body portion 44 and a base portion 46. The respective portions 44, 46 may be integrally formed, or may be separate pieces. Body portion 44 includes at least one body cavity 52 that is shaped to produce the main body 12 of the collimator 10. Thus, as shown in FIGS. 3A-B, the body cavity 52 has a generally parabolic or cone shape. The base portion 46 includes at least one straight cavity 54 that is shaped to produce the base 16 having parallel top and bottom surfaces 32, 34. Thus, the straight cavity 54 includes bottom mold surface 60 and top mold surface 62, which are generally parallel to each other (FIG. 3C). Material is injected into the mold 40 and the material fills the body cavity 52 and the straight cavity 54. A collimator 10 is produced with main body 12 attached to base 16, where base 16 has parallel surfaces 32, 34, such as shown in FIGS. 1A-B.

Figure 4A:
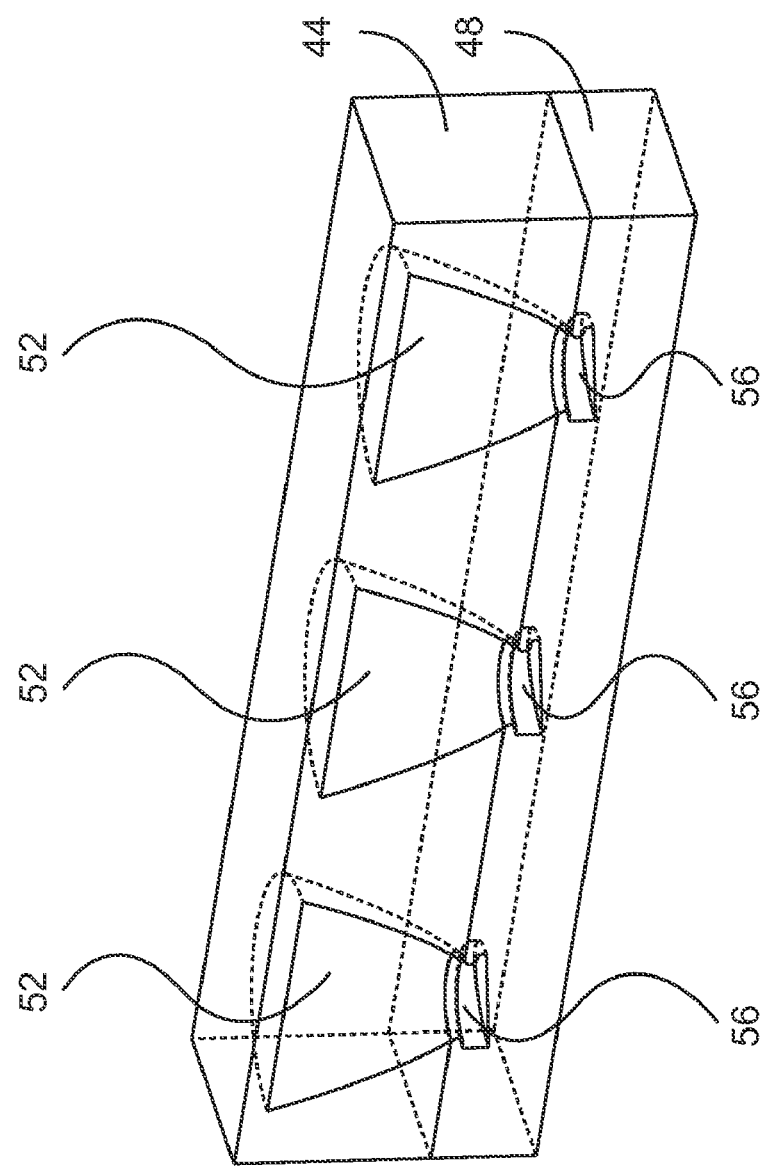
FIG. 4A is an isometric view of one-half of a mold (with hidden structure shown in broken lines) that may be used to make the collimator as shown in FIG. 2A-B.
Figure 4B:
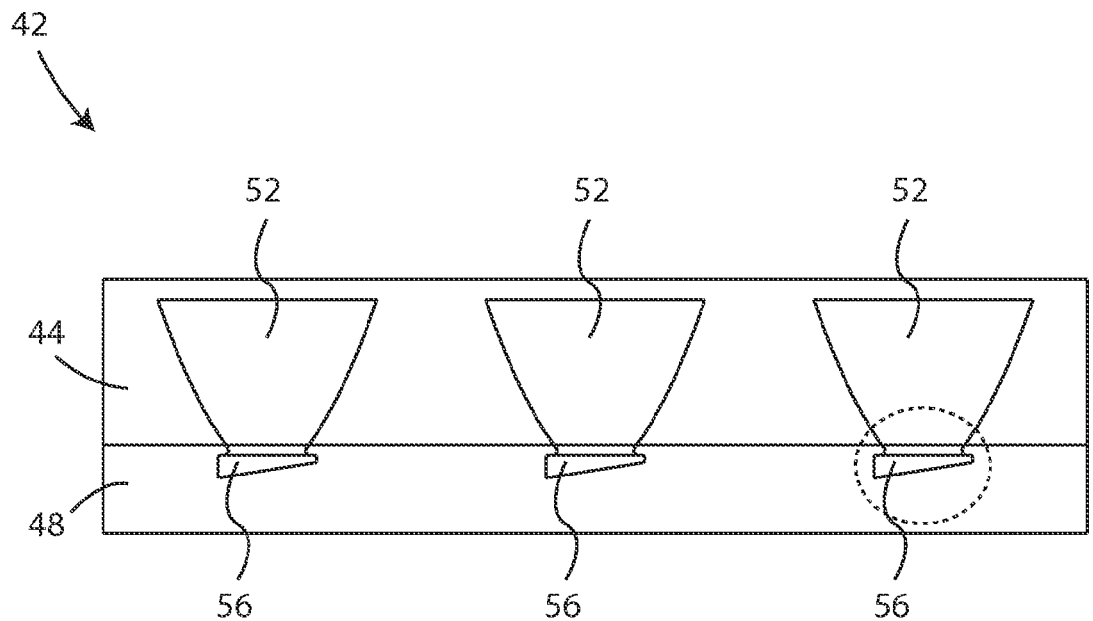
FIG. 4B is a side elevation view of the mold as shown in FIG. 4A.
Figure 4C:
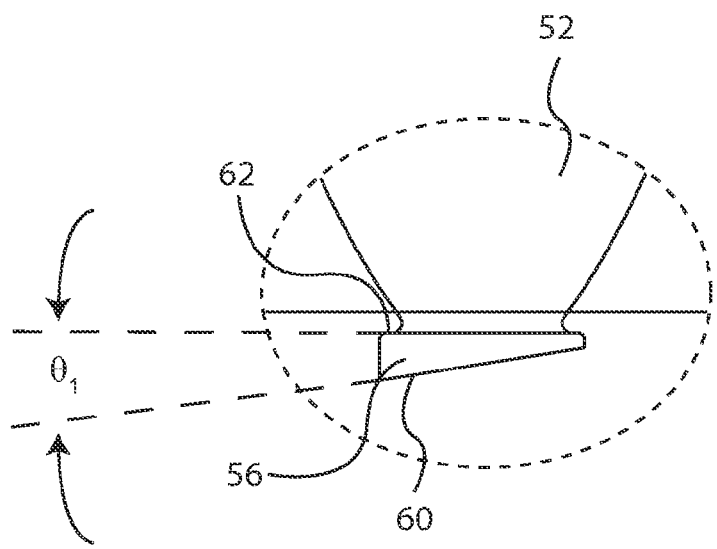
FIG. 4C is an enlarged fragmentary view of a portion of the mold shown in FIGS. 4A and B.

Similarly, certain embodiments illustrated in FIGS. 4A-C may include a mold 42 having a body portion 44 and a base portion 48. The respective portions 44, 48 may be integrally formed, or may be separate pieces. Body portion 44 includes at least one body cavity 52 that is shaped to produce the main body 12 of the collimator 10, and base portion 48 includes at least one angled cavity 56 that is shaped to produce the base 16 having angled top and bottom surfaces 32, 34. Thus, the angled cavity 56 includes bottom mold surface 60 and top mold surface 62, which are angled with respect to each other by angle $\theta_1$ (FIG. 4C). Material is injected into the mold 42 and the material fills the body cavity 52 and angled cavity 56. A collimator 30 is produced with main body 12 attached to base 16, where base 16 has angled surfaces 32, 34, such as shown in FIGS. 2A-B.

Figure 5A:
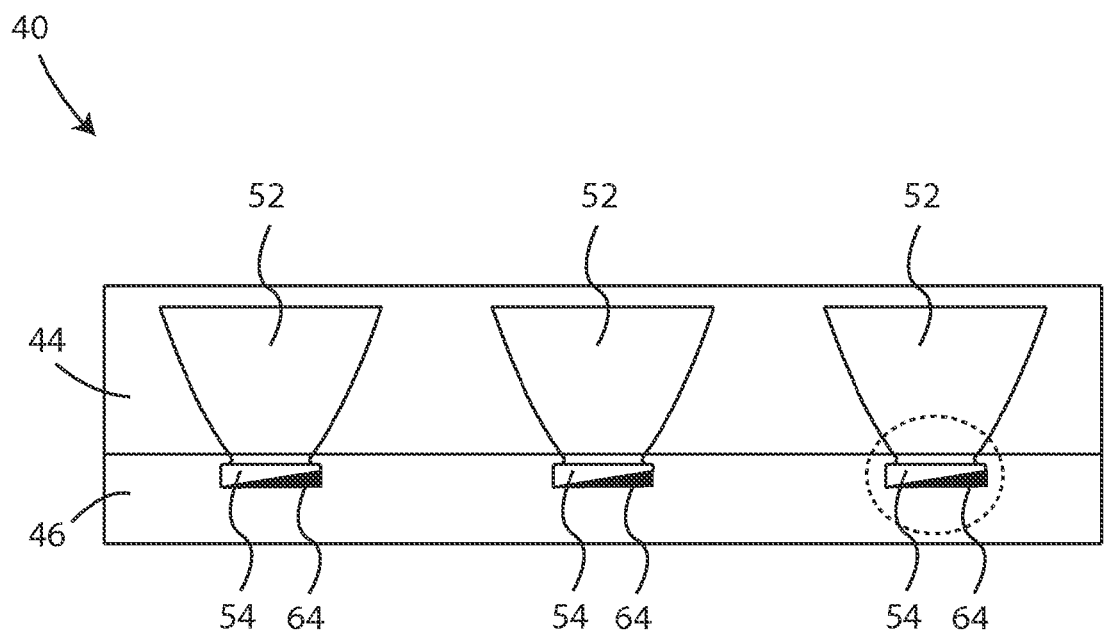
FIG. 5A is a side elevation view of one-half of yet another mold that may be used to make the collimator as shown in FIG. 2A-B.
Figure 5B:
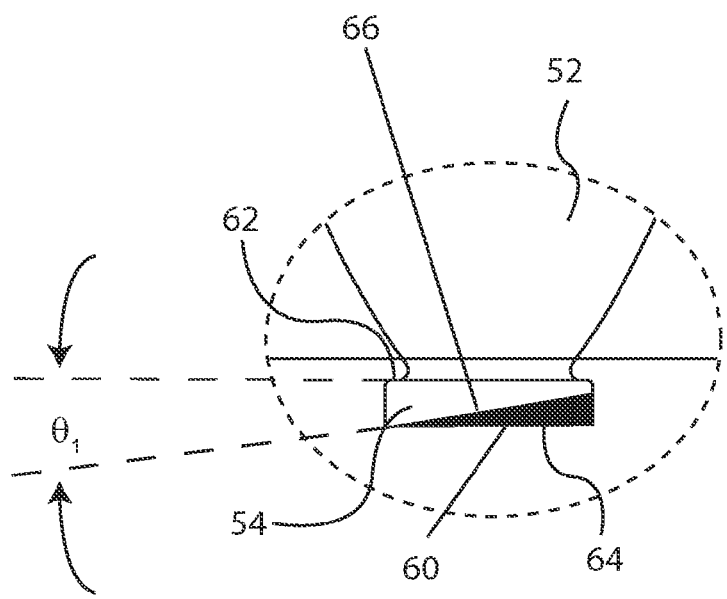
FIG. 5B is an enlarged fragmentary view of a portion of the mold shown in FIG. 5A.

Yet another method for making a collimator 30 with an angled base 16 is illustrated in FIGS. 5A and B. In this method, a wedge 64 having an angled top surface 66 is used. The top surface 66 of the wedge 64 is angled by angle $\theta_1$. The wedge 64 is placed into the straight cavity 54 of mold 40. Material is injected into the mold 40 and the material fills the body cavity 52 and straight cavity 54. But material does not fill the space occupied by the wedge 64. Thus, a collimator 30 is produced with main body 12 attached to base 16, where base 16 has an angled bottom surface 34 that is defined by the top surface 66 of the wedge 64. Using a wedge 64 is thus an alternative to using an angled cavity 56 with a pre-formed bottom mold surface 60 that is angled (as in FIG. 4A-C). Such a method of manufacture is efficient because a separate mold 42 with an angled cavity 56 is not required. Rather, the same mold 40 may be used to create either a collimator 10 having a base 16 with a parallel top and bottom surfaces 32, 34, or a collimator 30 having a base 16 with angled top and bottom surfaces 32, 34.

In other methods, the main body 12 of the collimators 10, 30 may be molded separately from the respective bases 16. Thus, a plurality of main bodies 12 may be molded using body portion 44. A plurality of bases 16 having parallel surfaces 32, 34 may be made with portion 46, and a plurality of bases 16 having angled surfaces 32, 34 may be made with portion 48. In a subsequent step, the main bodies 12 may be affixed to the bases 16 using any known technique, including but not limited to adhesion, mechanical fasteners, or welding. The main bodies 12 are generic as between the two collimators 10, 30. Thus, the same main body 12 may be used to make a collimator 10 having parallel surfaces 32, 34 as is used to make a collimator 30 having angled surfaces 32, 34. This method of manufacturing saves costs and reduces manufacturing time because a special main body 12 need not be constructed for the two types of collimators 10, 30.

The molds 40, 42 may be made of any appropriate material, including but not limited to stainless steel. The wedge 64 may also be stainless steel. The collimators 10, are made by injecting a material into the molds 40, 42. Such material for the collimators 10, 30 may include (but is not limited to) polycarbonate or acrylic. The material may be optical grade if desired. After the material is injected into the molds 40, 42, it may be allowed to harden by any technique known in the art, and a special tool may be used to remove the finished part.

The embodiments of the molds 40, 42 in the figures do not contain features to form the channel 18, aperture 38, or lens 20. Thus, it may be necessary to form the channel 18, aperture 38, and/or lens 20 (or other desired features) in a subsequent step after the molding has been completed. For example and not by way of limitation, a lathe or a cutter may be used to form the channel 18, aperture 38, and/or lens 20 after the molding step.

In other embodiments (not shown in the figures) the cavities 52, 54, 56 may include features such that the channel 18, aperture 38, and/or lens 20 are molded directly into the collimator 10, 30. For example, the mold 40 in FIG. 3B-C may include a column placed inside the cavities 52, 54, and the mold 42 in FIGS. 4-5 may include a column inside the cavities 52, 56. The column will take up space such that the material does not fill the space occupied by the column. Thus, when the mold is formed, the aperture 38 will be defined by the space previously occupied by the column. Other features, such as the channel 18 or lens 20, may similarly be formed by using shapes (such as columns or wedges) placed inside of the cavities.

Figure 6C:
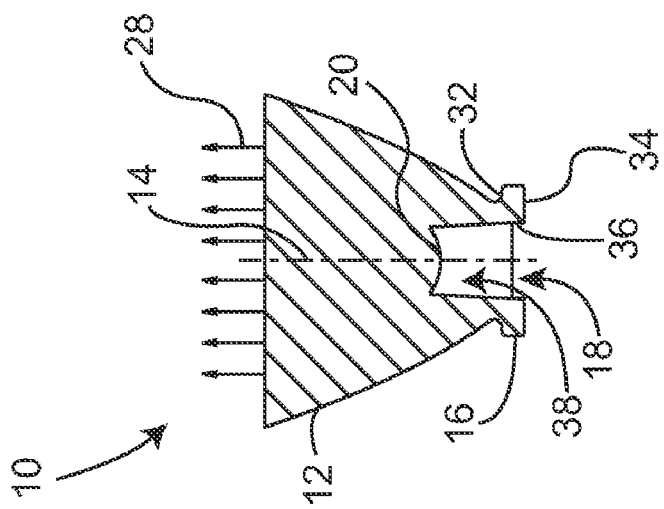
FIGS. 6A-C illustrate methods of manufacturing a collimator, such as the collimator shown in FIGS. 1A-B, according to certain embodiments of the invention.
Figure 6B:
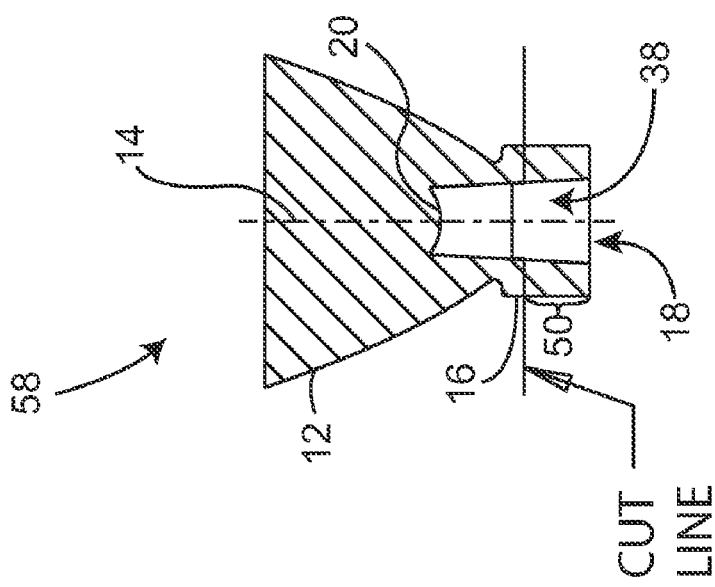
Figure 6A:
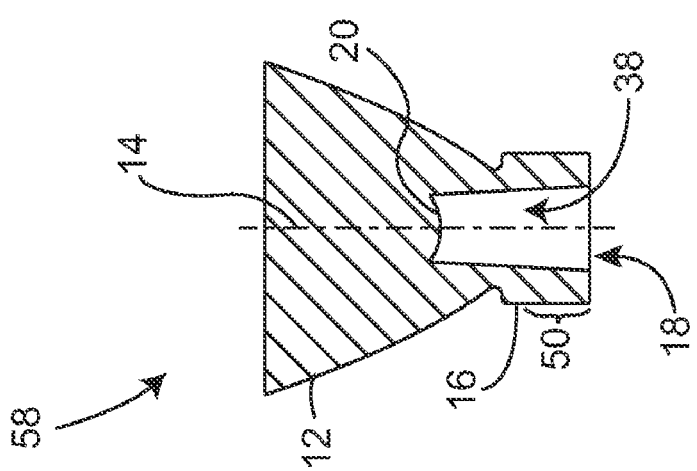

Still other methods of manufacture are illustrated in FIGS. 6-7. In such methods, the bases 16 of collimators 10, 30 may be formed by cutting. As shown in FIGS. 6A and 7A, there is first provided an uncut collimator 58 that includes at least a main body 12 and a base 16. The base 16 of the uncut collimator 58 has an extended portion 50. The uncut collimator 58 may be formed with injection molding as described above with respect to FIGS. 3-5. For example, a mold may be created (not shown) that has a body cavity 52 and a base cavity 54, wherein the base cavity 54 is extended to create extended portion 50 of the uncut collimator 58. The uncut collimator 58 may be made from polycarbonate or acrylic, and the mold used to create the uncut collimator 58 may be made of stainless steel.

The embodiments of the uncut collimator 58 as shown in FIGS. 6-7 include lens 20 and aperture 38. It should be understood that these features may provided in the uncut collimator 58 before the cutting steps described herein (as illustrated in FIGS. 6-7). Alternatively, the uncut collimator 58 may only include a main body 12 and a base 16. The uncut collimator 58 may be cut as described herein, and in a subsequent step, the lens 20, aperture 38, and/or channel 18 may be added by machining Machining may include (but is not limited to) cutting or lathing.

FIGS. 6A-C show a method for making a collimator 10 having a base 16 with parallel surfaces 32, 34. In FIG. 6B, a "cut line" is shown just above the extended portion 50. The cut line indicates the location of a cut that is made on the base 16 in order to remove the extended portion 50. The cut may be made with a variety of tools, including but not limited to a lathe, knife, or other cutter. In FIG. 6B, the cut line is horizontal and approximately perpendicular to the optical axis 14. Thus, as shown in FIG. 6C, after the cut is made and the extended portion 50 is removed, a collimator 10 is formed having a base 16 with a top and bottom surface 32, 34 that are parallel to one another. A middle portion of the cut line in FIG. 6B is indented so as to produce the channel 18 as shown in FIG. 6C.

The method of manufacture as shown in FIGS. 6-7 is beneficial because the same uncut collimator 58 may be used to form a collimator 10 having parallel surfaces 32, 34 or a collimator 30 having angled surfaces 32, 34. Thus, as shown in FIG. 7A, an uncut collimator 58 is first provided, which has an extended portion 50. In FIG. 7B, the cut line is shown at an angle $\theta_1$, and a middle portion of the cut line is indented. And in FIG. 7C, the cut has been made and the extended portion 50 has been removed, thus resulting in collimator 30 having a base 16 with a top and bottom surface 32, 34 that are angled with respect to one another by $\theta_1$, and including a channel 18. In an alternative method, the tool used to make the cut line may be kept horizontal, such that the cut line itself is horizontal, and the uncut collimator 58 may be set to the desired angle and then cut. In other words, either the cut line or the uncut collimator 58 may be angled to produce the desired base 16 having angled top and bottom surfaces 32, 34.

The foregoing is provided for purposes of illustration and disclosure of embodiments of the invention. It will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. An assembly comprising:
   a. a mounting board comprising a top surface;
   b. a light source mounted to the top surface of the mounting board and comprising a source axis; and
   c. a collimator comprising:
      i. a main body that defines a optical axis and comprising a first end, a second end opposite the first end, and an outer surface, wherein the outer surface comprises a parabolic shape;
      ii. a base adjacent to the main body, the base comprising a top surface and a bottom surface opposite the top surface, wherein the top surface is adjacent to the second end of the main body, and the top and bottom surfaces of the base define an angle $\theta_1$ with respect to each other, wherein $\theta_1$ is greater than 0°; and
      iii. an aperture extending into at least a portion of the main body and having a first end and a second end opposite the first end, wherein the collimator seats over the light source and onto the mounting board such that the bottom surface of the base seats on the mounting board, and wherein the source axis is angled with respect to the optical axis by an angle $\theta_2$, and wherein the angle $\theta_1$ is approximately equal to the angle $\theta_2$.

2. The assembly of claim 1, further comprising a lens located at the first end of the aperture.

3. The assembly of claim 1, wherein the collimator refracts and emits light emitted by the light source in a direction parallel to the optical axis.

4. The assembly of claim 1, wherein the angle $\theta_1$ is no more than 20°.

5. The assembly of claim 1, wherein the base of the collimator further comprises a channel dimensioned to receive at least a portion of the light source.

6. The assembly of claim 1, wherein the base and the main body are integrally formed.

7. The assembly of claim 1, wherein the base and the main body comprise at least one of polycarbonate or acrylic.

8. A collimator comprising:
   a. a main body that defines a optical axis and comprises a first end, a second end opposite the first end, and an outer surface, wherein the outer surface comprises a parabolic shape;
   b. a base adjacent to the main body, the base comprising a top surface and a bottom surface opposite the top surface, wherein the top surface is adjacent to the second end of the main body, and the top and bottom surfaces of the base define an angle $\theta_1$ with respect to each other, wherein $\theta_1$ is greater than 0°; and
   c. an aperture extending into at least a portion of the main body and having a first end and a second end opposite the first end,
   wherein the collimator is adapted to seat over a light source having a source axis and onto a light source mounting board such that the bottom surface of the base seats on the light source mounting board and such that the source axis is angled with respect to the optical axis by an angle $\theta_2$ approximately equal to the angle $\theta_1$.

9. The collimator of claim 8, further comprising a lens located at the first end of the aperture.

10. The collimator of claim 8, wherein the collimator is adapted to refract and emit light emitted by the light source in a direction parallel to the optical axis.

11. The collimator of claim 8, wherein the angle $\theta_1$ is no more than 20°.

12. The collimator of claim 8, wherein the base of the collimator further comprises a channel dimensioned to receive at least a portion of the light source.

13. The collimator of claim 8, wherein the base and the main body are integrally formed.

14. The collimator of claim 8, wherein the base and the main body comprise at least one of polycarbonate or acrylic.

* * * * *